(12) United States Patent
Porala et al.

(10) Patent No.: US 9,794,975 B1
(45) Date of Patent: Oct. 17, 2017

(54) PERSONAL DEVICE MANAGEMENT

(71) Applicant: MOBILE IRON, INC., Mountain View, CA (US)

(72) Inventors: Venkata Narayana Porala, Santa Clara, CA (US); Madhu Vemuri, Hyderabad (IN)

(73) Assignee: MOBILE IRON, INC., Mountain View, CA (US)

( * ) Notice: Subject to any disclaimer, the term of this patent is extended or adjusted under 35 U.S.C. 154(b) by 15 days.

(21) Appl. No.: 14/825,904

(22) Filed: Aug. 13, 2015

Related U.S. Application Data

(60) Provisional application No. 62/037,509, filed on Aug. 14, 2014.

(51) Int. Cl.
| | |
|---|---|
| *H04W 76/02* | (2009.01) |
| *H04L 29/08* | (2006.01) |
| *H04M 1/725* | (2006.01) |
| *H04W 4/14* | (2009.01) |

(52) U.S. Cl.
CPC ....... *H04W 76/023* (2013.01); *H04L 67/1091* (2013.01); *H04M 1/7253* (2013.01); *H04W 4/14* (2013.01)

(58) Field of Classification Search
CPC ..... H04W 12/08; H04W 12/06; H04W 4/001; H04W 24/02; H04W 76/02
See application file for complete search history.

(56) References Cited

U.S. PATENT DOCUMENTS

| | | | | |
|---|---|---|---|---|
| 2008/0072308 A1* | 3/2008 | Tanaka | ................... | H04L 63/145 726/12 |
| 2010/0299435 A1* | 11/2010 | Goto | ................... | H04L 63/0236 709/225 |
| 2013/0312058 A1* | 11/2013 | Thompson | .............. | G06F 21/54 726/1 |
| 2014/0020080 A1* | 1/2014 | Antypas, III | ....... | G06F 21/6218 726/9 |
| 2014/0149592 A1* | 5/2014 | Krishna | ................... | G06F 1/329 709/226 |
| 2014/0272894 A1* | 9/2014 | Grimes | .................... | G09B 5/08 434/350 |
| 2014/0278994 A1* | 9/2014 | Greenwood | ......... | H04B 1/3883 705/14.55 |
| 2015/0067785 A1* | 3/2015 | Donnellan | ............ | H04W 12/12 726/4 |

* cited by examiner

*Primary Examiner* — Khalid Shaheed
(74) *Attorney, Agent, or Firm* — Van Pelt, Yi & James LLP

(57) ABSTRACT

Peer-to-peer management of mobile devices is disclosed. In various embodiments, a message is received at a first mobile device indicating that a device management permission with respect to a second mobile device that is a peer of the first mobile device has been granted to a user associated with the first mobile device. The first mobile device is configured to be used to perform with respect to the second mobile device a device management action associated with the device management permission.

20 Claims, 16 Drawing Sheets

PERSONAL DEVICE MANAGEMENT

CROSS REFERENCE TO OTHER APPLICATIONS

This application claims priority to U.S. Provisional Patent Application No. 62/037,509 entitled PERSONAL DEVICE MANAGEMENT filed Aug. 14, 2014 which is incorporated herein by reference for all purposes.

BACKGROUND OF THE INVENTION

Typically, mobile device management (MDM) has been performed in a centralized manner, e.g., using an MDM server or other centralized node to manage a plurality of managed devices. However, for a small business or other relatively small groups of users, such as private individuals in a same family, students or others working on a common project, etc., the cost and level of knowledge and/or sophistication that may be required to acquire access to and use such tools may be prohibitive.

BRIEF DESCRIPTION OF THE DRAWINGS

Various embodiments of the invention are disclosed in the following detailed description and the accompanying drawings.

DETAILED DESCRIPTION

Figure 1A:
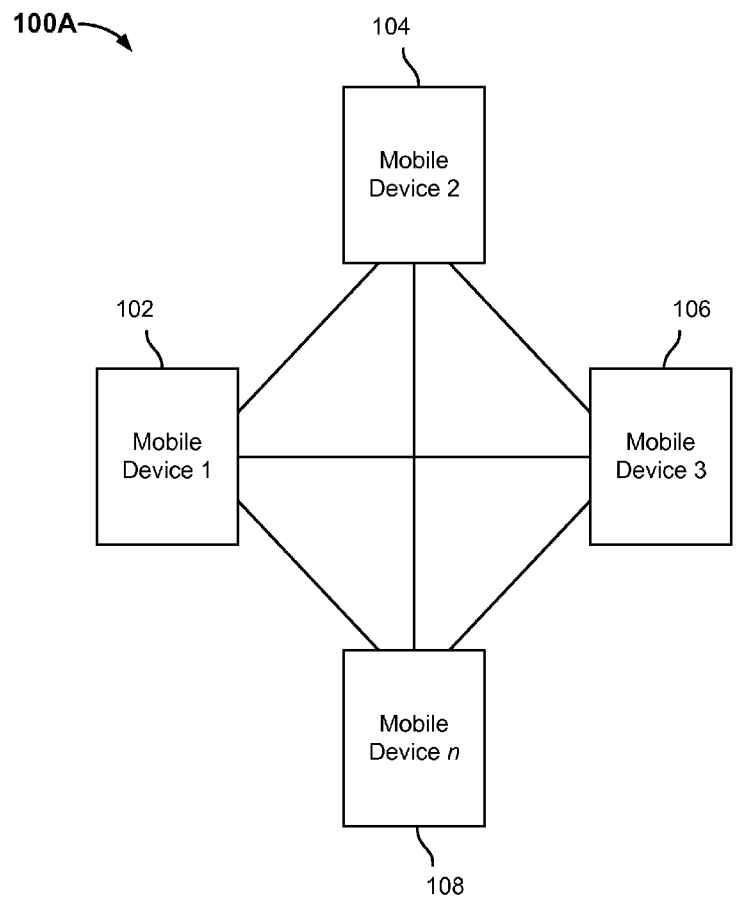
FIG. 1A is a block diagram illustrating an embodiment of a peer-to-peer management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Peer-to-peer management of mobile devices is disclosed. In various embodiments, using techniques disclosed herein any group (e.g., of users, devices, etc.) can form a network and manage each other's devices. For example, users may manage devices within in a family or among friends, or a business owner or manager may manage employees' devices, etc.

Example use cases may include, without limitation:
1) A parent may lock, locate, and/or otherwise manage his/her child's device.
2) A friend may locate another friend's device.

3) A parent may perform a backup operation (e.g., take a contacts backup) of a family member's device(s).

4) A first user may utilize a peer's device capabilities (e.g., a second user's device capabilities). For example, the first user's device may not include a high-definition multimedia interface (HDMI), projector, Bluetooth printer, and/or other profile(s). And if the second user's device has these capabilities, then the first user can utilize these capabilities using the peer-to-peer management framework disclosed herein.

For clarity of description, certain examples included in this disclosure are described with reference to certain types of users (e.g., father, son, friend, first user, etc.). The disclosure is, however, not limited to certain types of users and encompasses all types of users and/or devices.

In various embodiments, groups of devices may form their own network, and management permissions for a device may be provided from the device to other peer devices in the group.

FIG. 1A is a block diagram illustrating an embodiment of a peer-to-peer management system. In the example shown, peer-to-peer management system 100A includes a plurality of mobile devices 1 to n, represented in FIG. 1A by mobile devices 102, 104, 106, and 108. In the example shown, each of the devices 102, 104, 106, and 108 is connected to every other one of the devices in the system 100A. In this example, each device in the system has the potential to be managed by and/or to manage any other device in the system 100A.

In various embodiments, a lightweight messaging service may be used by the devices 102, 104, 106, and 108 to exchange peer-to-peer device management communications. For example, in various embodiments, the techniques disclosed herein can be implemented at least in part using a third party messaging protocol (e.g., a Jabber protocol) and/or any other protocol which may provide for communication between devices. In certain cases, each user (e.g., in a group of users) may have an email account. In one example, a family of managed devices may comprise email accounts for each device including, for example, father@<domain>, mother@<domain>, son@<domain>, daughter@<Domain>, and/or other family member's accounts. The father's account (e.g., Jabber account) may, for example, be associated with the mother's, son's and/or daughter's accounts (e.g., Jabber accounts) as, for example, buddies.

In various embodiments, the techniques disclosed herein may be implemented using other frameworks including, for example, Port-based Short Message Service (SMS), Binary SMS, and/or any application providing communication between devices and/or apps. In one example, sending a lock command using Port-based SMS and/or Binary SMS from a father's device to son's device may include the following operations:

1) Managed device may listen (e.g., monitor for communications) on any SMS receiving port, for example, port 5522.
2) Managing peer device sends the binary SMS to managed device, for example, to the port 5522.
3) Managed device is listening for any SMS received on port 5522, and once the SMS is received on this port the binary SMS is decoded and the corresponding operation is executed.

In various embodiments, each device comprising system 100A may have installed thereon a management app or other agent to enable the user to grant management permissions to designated other devices comprising the system 100A and/or to initiate a management action by or otherwise with respect to a device with respect to which the initiating device has been granted a corresponding management permission. In various embodiments, a mobile app or other client or agent on a mobile device may include a user interface and associated functionality to grant management permissions to other users and/or associated devices. For example, a user of a device may be provided with an interface to select a contact (or group of contacts) and to indicated one or more management permissions to be granted to that contact. In various embodiments, a management permission of any defined scope may be granted. Examples include, without limitation, the ability to lock or wipe (remove all user data from) a device, the ability to locate a device, the ability to back up all or selected data of a device, the ability to download from the device or a third party distribution node a copy of an app shared from the device, etc.

In various embodiments, an instance of the management app on a mobile device to which a management permission has been delegated may provide an interface to review and approve/decline management permission grants received and/or offered by other users/device and/or to initiate a management action corresponding to and within an authorized scope of a previously-granted permission.

In various embodiments, management-related communications between/among peers may be encrypted. Public key infrastructure (PKI) and/or other techniques may be used. In some embodiments, permission grants may be communicated between peer-to-peer management app instances on respective devices comprising a peer-to-peer management domain, e.g., mobile devices 1 to n in the system 100A of FIG. 1A in the form of permission lists or other data sets. For example, an encrypted list comprising a set of name-value pairs each indicating a granted permission and associate scope (e.g., all data, selected data, etc.) may be sent. In some embodiments, an encrypted list of permissions may be sent. A receiving instance of the management app may decrypt and parse the list to determine which permissions have been granted by the sending user/device to the receiving user/device. Permissions granted by the sending user may be stored on the receiving device in a manner that associates the permissions with the granting user, e.g., an associated contact.

Figure 1B:
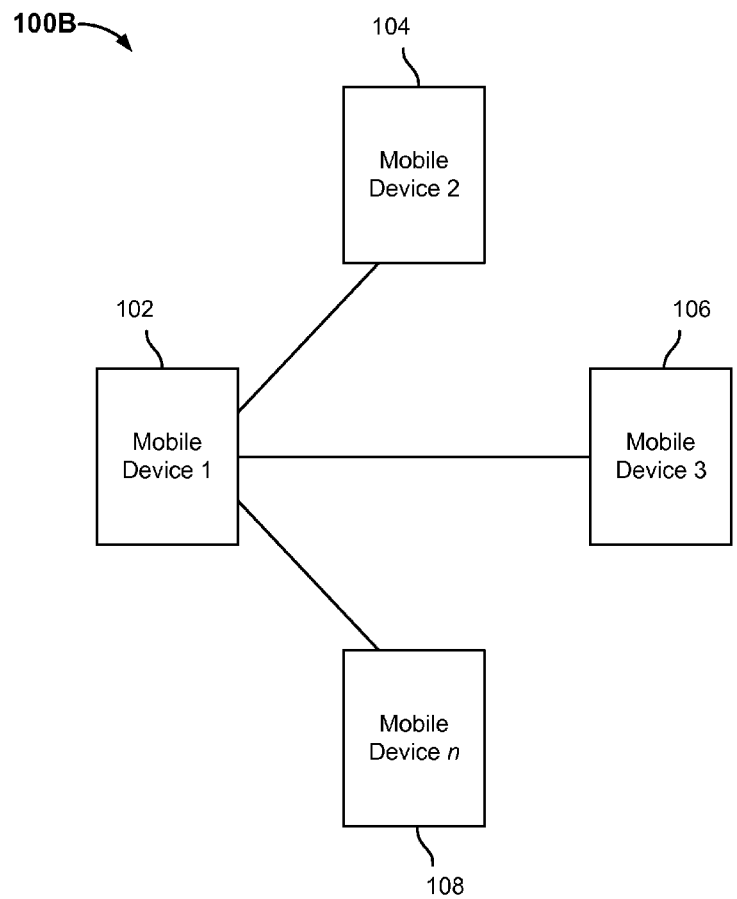
FIG. 1B is a block diagram illustrating an embodiment of a device-to-device management system.

FIG. 1B is a block diagram illustrating an embodiment of a device-to-device management system. In the example shown in FIG. 1B, the system 100B includes the same devices 1 to n, as in FIG. 1A, represented as in FIG. 1A by devices 102, 104, 106, and 108. However, in the example shown in FIG. 1B, each of the devices 2 to n, represented in FIG. 1B by devices 104, 106, and 108, is connected only to the device 102. The configuration shown in FIG. 1B may be used, for example, by a manager to manage the respective devices of a group of employees. In some embodiments, the management app instances on the devices 2 to n in this example may limit users of such devices to granting permissions to a contact associated with device 102. In some embodiments, management app instances on devices 104, 106, and 108 may be configured to allow (or require) users of those devices to grant any (or prescribed) permissions to a contact associated with device 102. In some embodiments, management app instances on devices 104, 106, and 108 may be configured to restrict users of those devices to granting a subset of permissions and/or different permissions to other ones of the devices 104, 106, and 108.

Figure 1C:
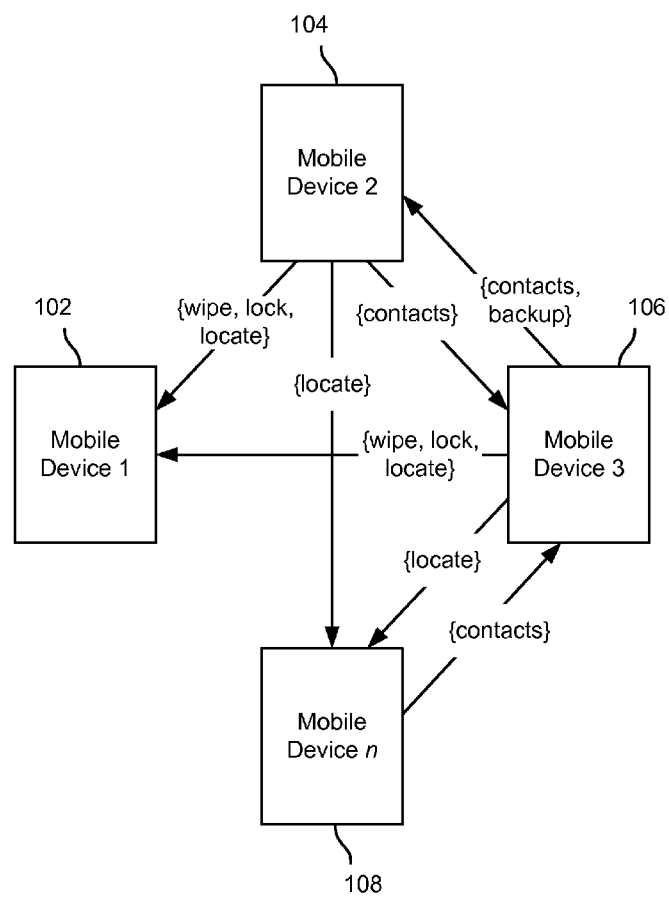
FIG. 1C is a block diagram illustrating an example of management permissions granted in an embodiment of a device-to-device management system.

FIG. 1C is a block diagram illustrating an example of management permissions granted in an embodiment of a device-to-device management system. In the example shown, a user of device 104 has granted to a contact associated with device 102 permissions to wipe, lock, and locate device 104. In addition, the user of device 104 has granted to a contact associated with device 106 a permission to access (e.g., read) contacts stored on device 104, and has granted to a contact associated with device 108 a permission to locate device 104. In this example, a user of device 106 has granted to the user of device 104 a reciprocal permission to access contacts stored on device 106, and also a permission to back up data stored on device 106. In addition, the user of device 106 has granted to a contact associated with device 102 permissions to wipe, lock, and locate device 106. Finally, a user of device 106 has granted to a contact associated with device 108 a permission to locate device 106, and a user of device 108 has granted to the user of device 106 a permission to access contacts stored on device 108.

The various permissions shown as having been granted in the example shown in FIG. 1C are merely illustrative. In various embodiments, other permissions may be defined and granted, at the option of users of devices in the peer-to-peer group.

In various embodiments, management permissions may be granted to any contact that has a peer-to-peer management app as disclosed herein installed and for which the granting user has a contact and/or other data usable to send management communications to the destination device as described herein. In various embodiments, any messaging or other communication facility, service, and/or protocol may be used that allows a device and/or a peer-to-peer management app installed thereon to listen for and receive management communications from other devices, and specifically from management app instances on such other devices.

Figure 2:
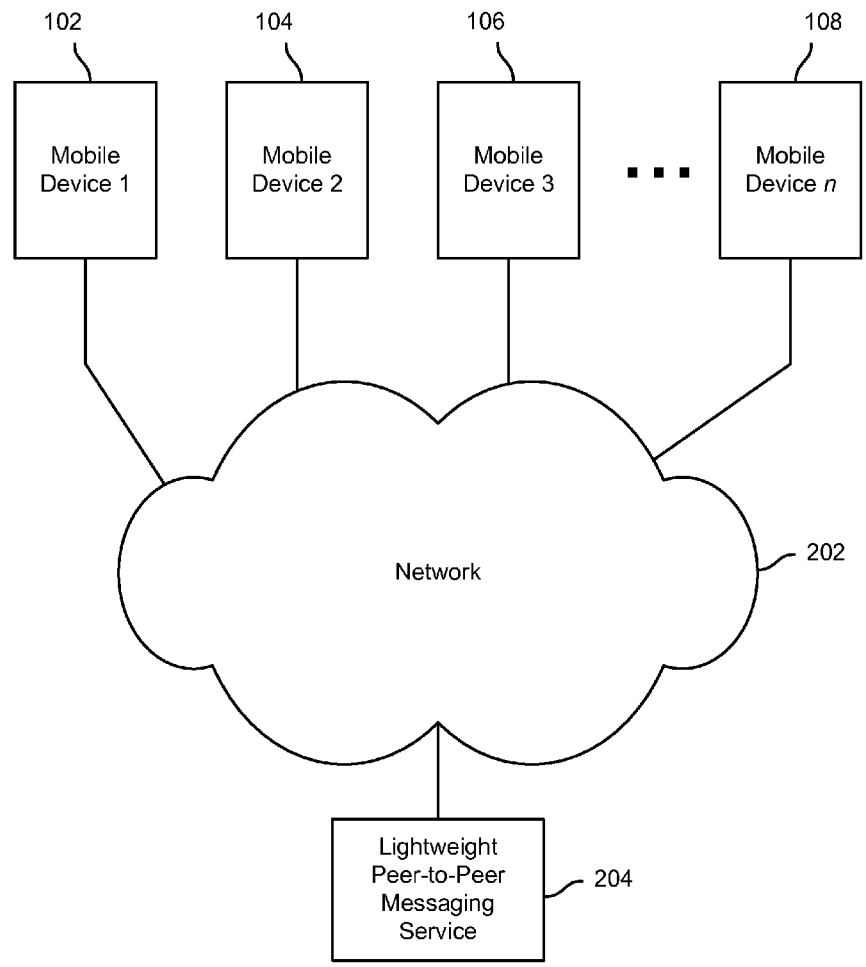
FIG. 2 is a block diagram illustrating an embodiment of a messaging infrastructure to provide a device-to-device management system.

FIG. 2 is a block diagram illustrating an embodiment of a messaging infrastructure to provide a device-to-device management system. In the example shown, the devices 1 to n of FIGS. 1A-1C, represented by devices 102, 104, 106, and 108, are connected via network 202 to a lightweight messaging service 204. The service 204 may be any messaging or other communication service and/or protocol that may be used by management app instances on the respective devices 102, 104, 106, and 108 to exchange management communications, such as permission lists and acknowledgements thereof and communications to initiate and/or perform management actions.

Figure 3:
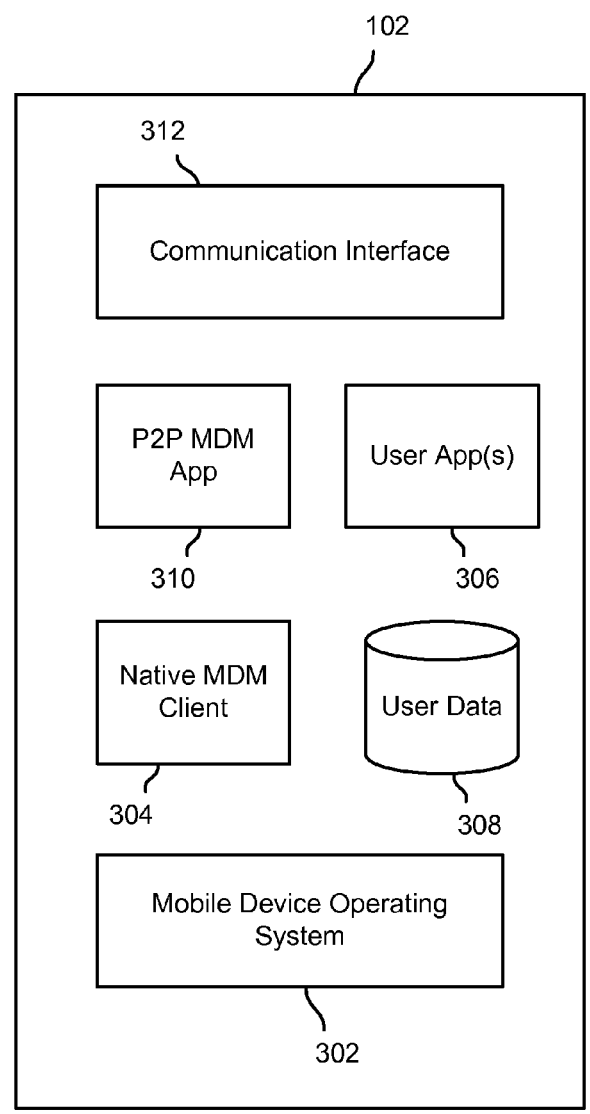
FIG. 3 is a block diagram illustrating an embodiment of a mobile device configured to participate in a device-to-device management system.

FIG. 3 is a block diagram illustrating an embodiment of a mobile device configured to participate in a device-to-device management system. In the example shown, mobile device 102 is shown to include a mobile device operating system 302, e.g., iOS, Android, etc., running on a processor (not shown) comprising the device 102. A native mobile device management (MDM) client 304 is associated with the mobile device operating system 302 in this example. In various embodiments, a native MDM client 304 may or may not be present on a given device. In the example shown, one or more user apps (e.g., mobile apps) 306 are installed on the device and user data (e.g., app objects) are stored in a user data store 308 provided on a memory or other storage device (not shown) comprising mobile device 102.

A peer-to-peer MDM app 310 is installed on the device 102. In various embodiments, peer-to-peer MDM app 310 may be identified to the native MDM client 304, or otherwise in the case of a device that does not have a native MDM client 304, as having authorization to perform certain management actions on the device 102. For example, peer-to-peer MDM app 310 may be identified as having the authority to wipe or lock the device, to obtain a current location of the device, to access contacts or other data sets stored on the device, etc. In various embodiments, peer-to-peer MDM app 310 may be responsive to communications received via communication interface 312 from other instances of peer-to-peer MDM app 310 installed on peer devices. For example, peer-to-peer MDM app 310 may be configured to receive via communication interface 312 a communication including a list of permissions that have been granted to a user associated with device 102 by a user of a peer device. The peer-to-peer MDM app 310 may be configured to parse the communication to determine the permissions that have been granted and to display the permissions in an interface that enables a user of device 102 to accept or decline the grant. In some embodiments, the peer-to-peer MDM app 310 may send a responsive communication informing the grantor of the recipient's decision to accept or decline the grant, and if accepted the peer-to-peer MDM app 310 may store corresponding data on device 102.

In various embodiments, peer-to-peer MDM app 310 may be configured to provide a user interface to enable a user of device 102 to grant management permissions to other users (e.g. peers or contacts) as disclosed herein.

In various embodiments, peer-to-peer MDM app 310 may be responsive to management communications received via communications interface 312 from other instances of peer-to-peer MDM app 310 installed on peer devices to initiate performance of a management action within a scope of a permission granted to the initiating user by a user of device 102. For example, peer-to-peer MDM app 310 may be configured to decrypt and parse received communications to determine which management action has been requested, to verify whether the sending user has been granted a corresponding permission that has not been revoked, and to interact with the native MDM client 304 (if present) and/or other entities on the mobile device (e.g., user data 308, operating system 302) as needed to perform a management action requested by an authorized peer. For example, in some embodiments if a command to wipe or lock the device 102 were received, the peer-to-peer MDM app 310 would verify that the sender has a currently valid wipe or lock permission and, if so, would initiate a wipe or lock of the device 102, as appropriate, in response to the communication. In another example, on receiving a message to access contacts on device 102, the peer-to-peer MDM app 310 may verify that the requestor has been granted a permission that includes access to contacts and may read the contacts and provide them (or a requested part of them) via one or more responsive communications. In a further example, on receiving a request to back up all or specific user data on device 102, the peer-to-peer MDM app 310 may verify the requesting user has a corresponding permission and, if so, may read and stream out to the requesting device and/or a node designated by same the data requested to be backed up. In the case of a request to provide a location of device 102, the peer-to-peer MDM app 310 may obtain a current (e.g., GPS) location and send the location to the requesting peer. While specific examples of management actions are described herein, in various embodiments the peer-to-peer MDM app 310 may be configured to perform any management action that can be defined to be performed on a device, and may be responsive to communications from peers to whom/which corresponding permissions have been granted with respect to the device 102 to cause such requested actions to be performed on and/or with respect to device 102.

Figure 4A:
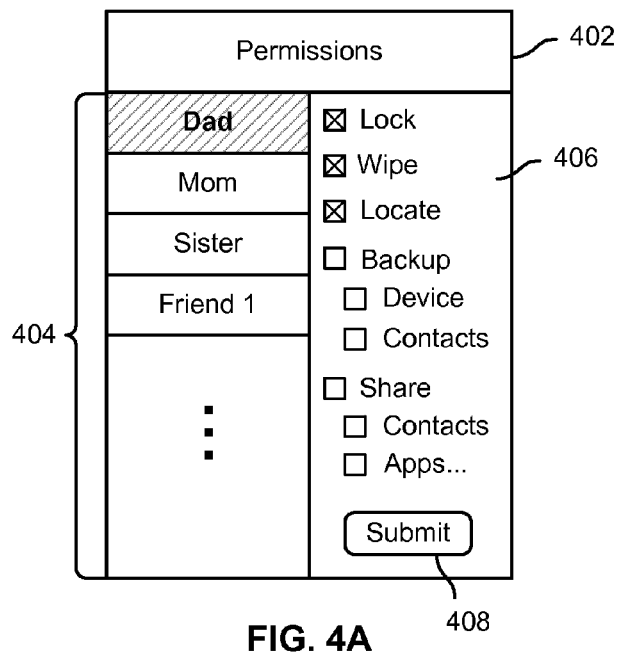
FIG. 4A is a block diagram illustrating an example of an administrative user interface to grant management permissions in an embodiment of a device-to-device management system.

FIG. 4A is a block diagram illustrating an example of an administrative user interface to grant management permissions in an embodiment of a device-to-device management system. In various embodiments, the user interface of FIG.

4A may be displayed on a mobile device, such as devices 102, 104, 106, and 108 of FIGS. 1A-1C, e.g., by a peer-to-peer MDM app, such as app 302 of FIG. 3. In the example shown, the user interface includes a header portion 402 in which the interface is identified as one to define/grant permissions. Contacts (e.g., Jabber or other contacts) are displayed in a contacts area 404. In the example shown, the contact named "Dad" is highlighted, indicating it is in a selected state. A permission grant area 406 lists a plurality of permissions and for each a checkbox control to select or deselect that permission. In the example shown, "lock", "wipe", and "locate" permissions have been selected. A "submit" button 408 is provided. In various embodiments, selection of the "submit" button 408 would result in the selected permissions being granted to one or more of a user and a device associated with the contact "Dad". In various embodiments, a "management request" or "permission grant" message may be sent to the contact. An instance of the peer-to-peer management app on a device at which the message was received may be responsive to display to the grantee a list of permissions granted and options to either accept or decline the grant.

In various embodiments, selection of a contact in contacts area 404 of the user interface shown in FIG. 4A may result in previously-granted permissions being shown in the selected (checked) state in the permissions area 406. Previously-granted permissions may be revoked by deselecting those permissions and selecting "submit" button 408. Similarly, additional permissions may be granted by selecting those permissions and selecting the "submit" button 408.

Figure 4B:
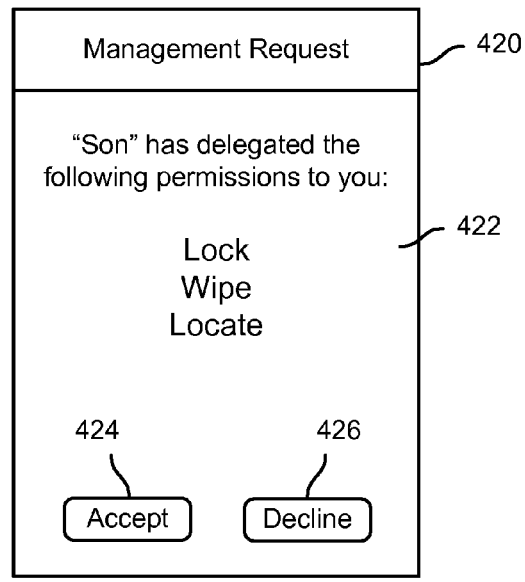
FIG. 4B is a block diagram illustrating an example of an administrative user interface to review and accept/decline management permissions from another user in an embodiment of a device-to-device management system.

FIG. 4B is a block diagram illustrating an example of an administrative user interface to review and accept/decline management permissions from another user in an embodiment of a device-to-device management system. In various embodiments, the user interface of FIG. 4B may be displayed on a mobile device, such as devices 102, 104, 106, and 108 of FIGS. 1A-1C, e.g., by a peer-to-peer MDM app, such as app 302 of FIG. 3. In the example shown, the user interface includes a header portion 420 in which the interface is identified as one to review and accept/decline permissions granted by another user to a user to whom the user interface of FIG. 4B is displayed. In a permissions granted display area 422, permissions granted by the granting user are listed, in this example permissions to lock, wipe, or locate the granting user's device (as in the example shown in FIG. 4A as being granted to the contact "Dad"). The user interface of FIG. 4B further includes an "accept" button 424, to indicate acceptance of the granted permissions, and a "decline" button 426, to decline the grant. In various embodiments, acceptance of a grant, such as by selecting "accept" button 424, results in data being stored, e.g., by a peer-to-peer management app that displayed the user interface of FIG. 4B, to reflect that the user to whom the interface of FIG. 4B was displayed has been granted the permissions shown in permissions granted display area 422. In various embodiments, the peer-to-peer management app that displayed the user interface of FIG. 4B may be configured to send a notification to the granting user to indicate that the user has accepted or declined the grant, as applicable.

Figure 4C:
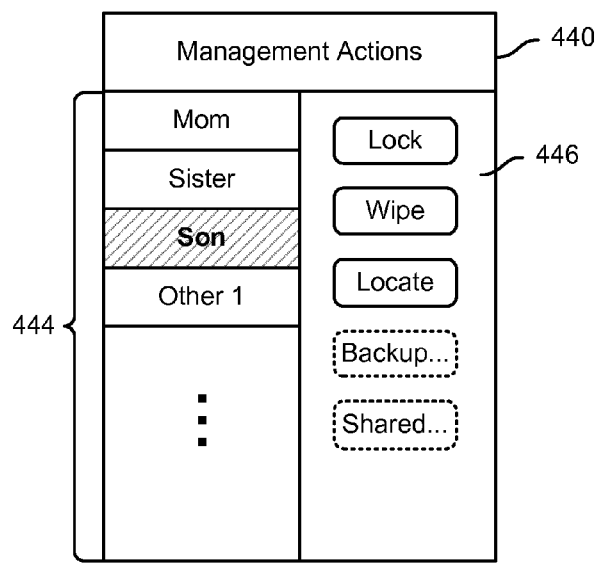
FIG. 4C is a block diagram illustrating an example of an administrative user interface to initiate management actions in an embodiment of a device-to-device management system.

FIG. 4C is a block diagram illustrating an example of an administrative user interface to initiate management actions in an embodiment of a device-to-device management system. In various embodiments, the user interface of FIG. 4C may be displayed on a mobile device, such as devices 102, 104, 106, and 108 of FIGS. 1A-1C, e.g., by a peer-to-peer MDM app, such as app 302 of FIG. 3. In the example shown, the user interface includes a header portion 440 in which the interface is identified as one to initiate a management action within the scope of permissions granted by another user to a user to whom the user interface of FIG. 4C is displayed. In this example, contacts are listed in a contacts display area 444. The contact named "Son" is highlighted, indicating that contact is in a selected state. In a management action initiation area 446, user selectable controls to perform management actions with respect to the selected contact are displayed. In this example, buttons to "lock", "wipe", or "locate" the device associated with the contact "Son" are shown in a user-selectable (i.e., active) state, which other controls (e.g., to "backup" data on target device, or to obtain "shared" access to apps or other content and/or functionality of the target device) are ghosted out, as indicated by the dashed lines, indicating in this example that those actions are not available to be initiated with respect to the selected contact "Son", e.g., because the associated permissions have not been delegated by the contact "Son" to the user to whom the interface of FIG. 4C is being displayed.

Figure 5:
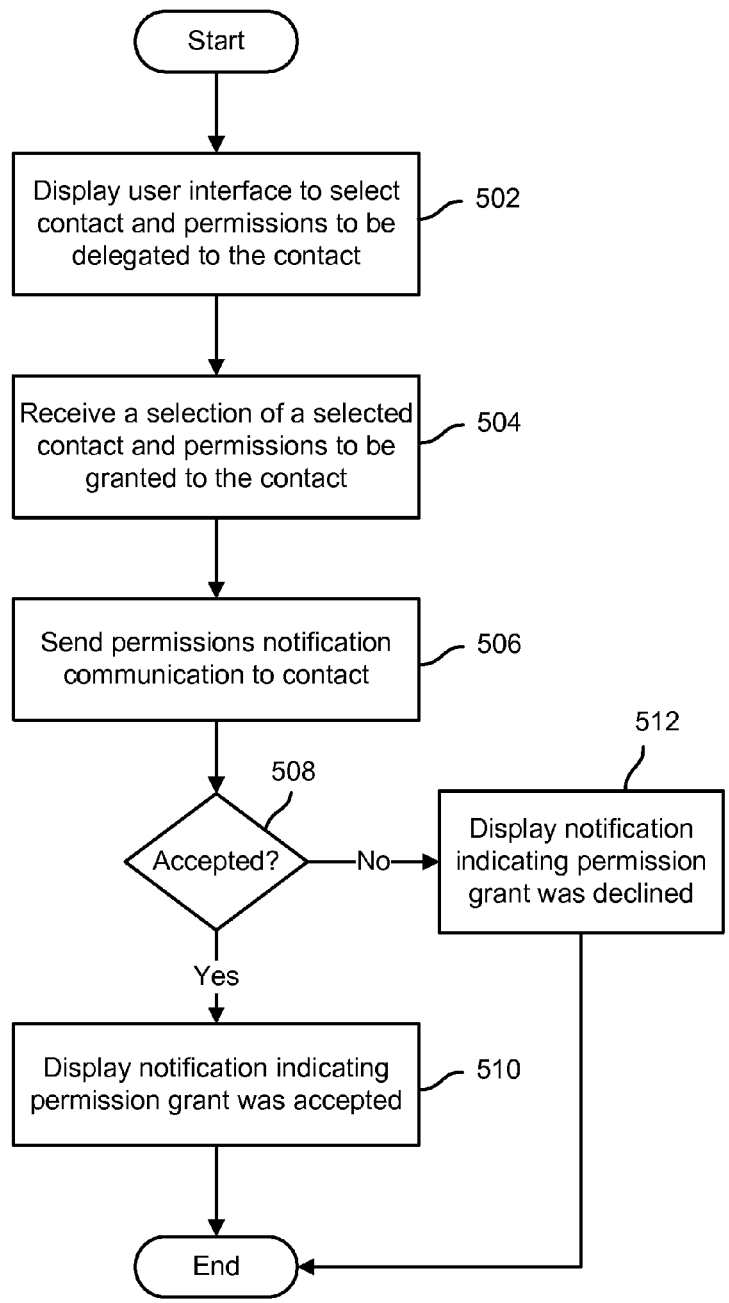
FIG. 5 is a flow chart illustrating an embodiment of a process to grant management permissions in an embodiment of a device-to-device management system.

FIG. 5 is a flow chart illustrating an embodiment of a process to grant management permissions in an embodiment of a device-to-device management system. In various embodiments, the process of FIG. 5 may be performed on a mobile device, such as devices 102, 104, 106, and 108 of FIGS. 1A-1C, e.g., by a peer-to-peer MDM app, such as app 302 of FIG. 3. In the example shown, a user interface is displayed to enable a user to select a contact and indicate permissions to be granted to the contact (502), e.g., as in the example shown in FIG. 4A. A selection of a selected contact and one or more permissions to be granted to the selected contact are received (504). A "permissions granted" notification is sent to the contact (506). If a response is received indicating the grant has been accepted (508), a notification is displayed indicating the grant was accepted (510) and data associated with the contact is updated to reflect that the contact accepted the permissions. If the grant is declined (508), a corresponding notification is displayed (512) and data associated with the contact is updated to reflect that the contact declined the permissions.

Figure 6:
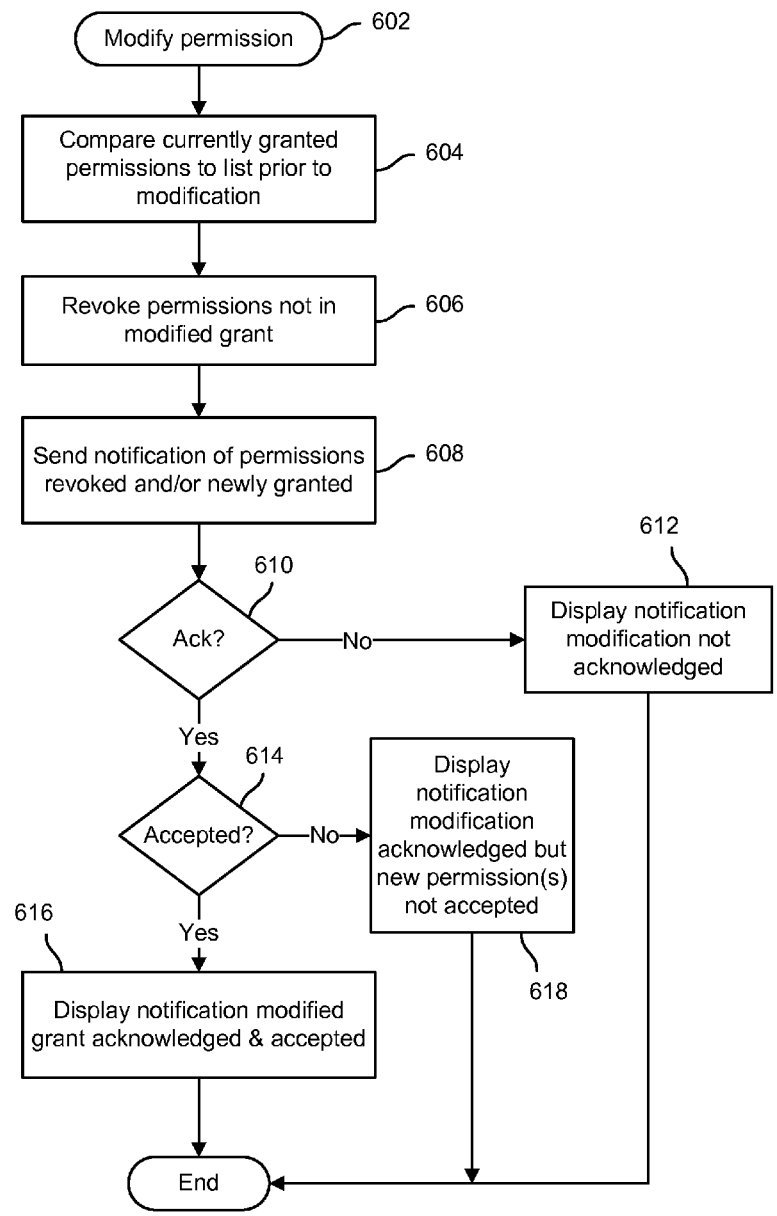
FIG. 6 is a flow chart illustrating an embodiment of a process to modify management permissions in an embodiment of a device-to-device management system.

FIG. 6 is a flow chart illustrating an embodiment of a process to modify management permissions in an embodiment of a device-to-device management system. In various embodiments, the process of FIG. 6 may be performed on a mobile device, such as devices 102, 104, 106, and 108 of FIGS. 1A-1C, e.g., by a peer-to-peer MDM app, such as app 302 of FIG. 3. In the example shown, an indication is received to modify permissions granted to a contact (602). For example, a user interface such as the one shown in FIG. 4A may have been used to view and modify permissions as granted previously to a contact. The currently granted permissions (if any) are compared to the previously-granted permissions (604) to determine the differences. Any permission that has been removed from the permissions granted to the contact is revoked immediately (606). A notification message indicating which, if any, permissions have been revoked and which, if any, permissions have been newly granted is sent to the contact (608). If the notification message is not acknowledged within a prescribed time (610), a notification is displayed (612). If the message is acknowledged (610) via a response that indicates that any newly-granted permissions have been accepted (614), a notification that modified permissions have been acknowledged and accepted is displayed (616). If the message is acknowledged (610) via a response that indicates that any newly-granted permissions have been declined (614), a notification is displayed indicating that the message has been acknowledged but newly granted permissions were declined (618).

Figure 7:
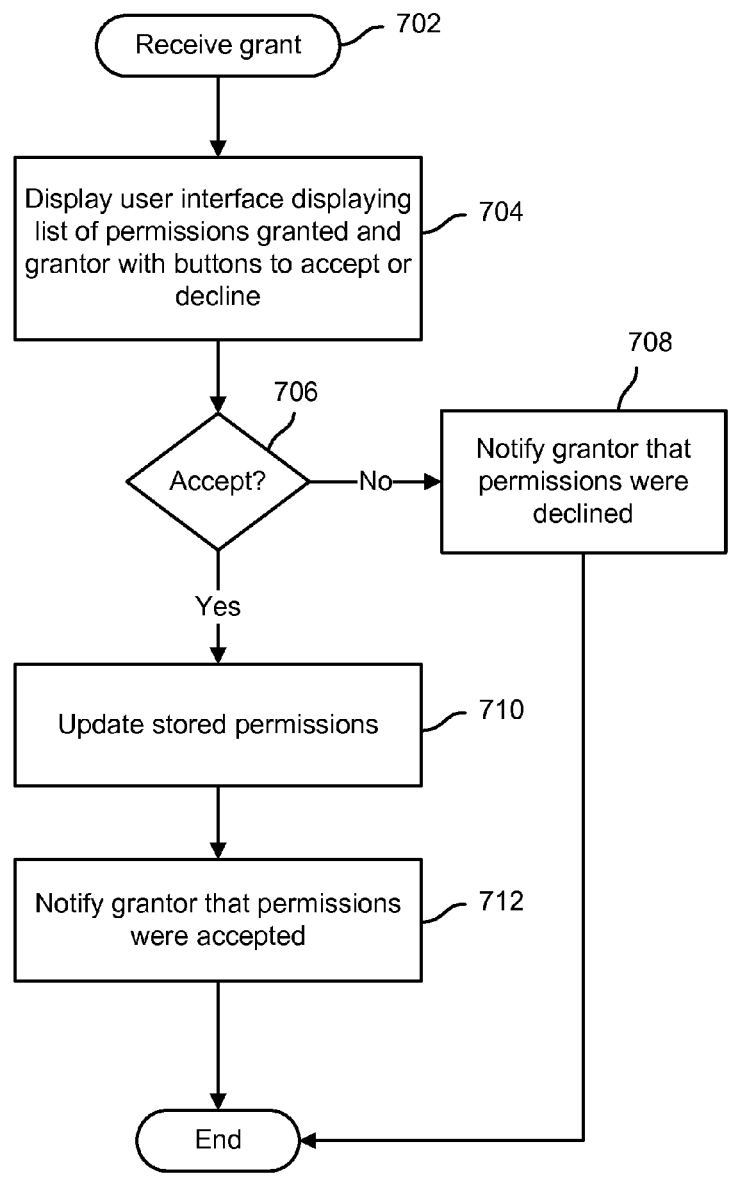
FIG. 7 is a flow chart illustrating an embodiment of a process to review management permissions from another in an embodiment of a device-to-device management system.

FIG. 7 is a flow chart illustrating an embodiment of a process to review management permissions from another in an embodiment of a device-to-device management system. In various embodiments, the process of FIG. 7 may be performed on a mobile device, such as devices 102, 104, 106, and 108 of FIGS. 1A-1C, e.g., by a peer-to-peer MDM app, such as app 302 of FIG. 3. In the example shown, when a message indicate a new or modified permission grant is received (702), a user interface (e.g., as in the example shown in FIG. 4B) is displayed (704) to notify a user of a new or modified permission grant by another user and to enable the user to accept or decline the grant. If the user declines the grant (706), the granting user is notified that the permissions were declined (708). If the user accepts the grant (706), data indicating that the permissions are held with respect to the granting user is stored (710) and the granting user is notified that the permissions have been accepted (712).

Figure 8:
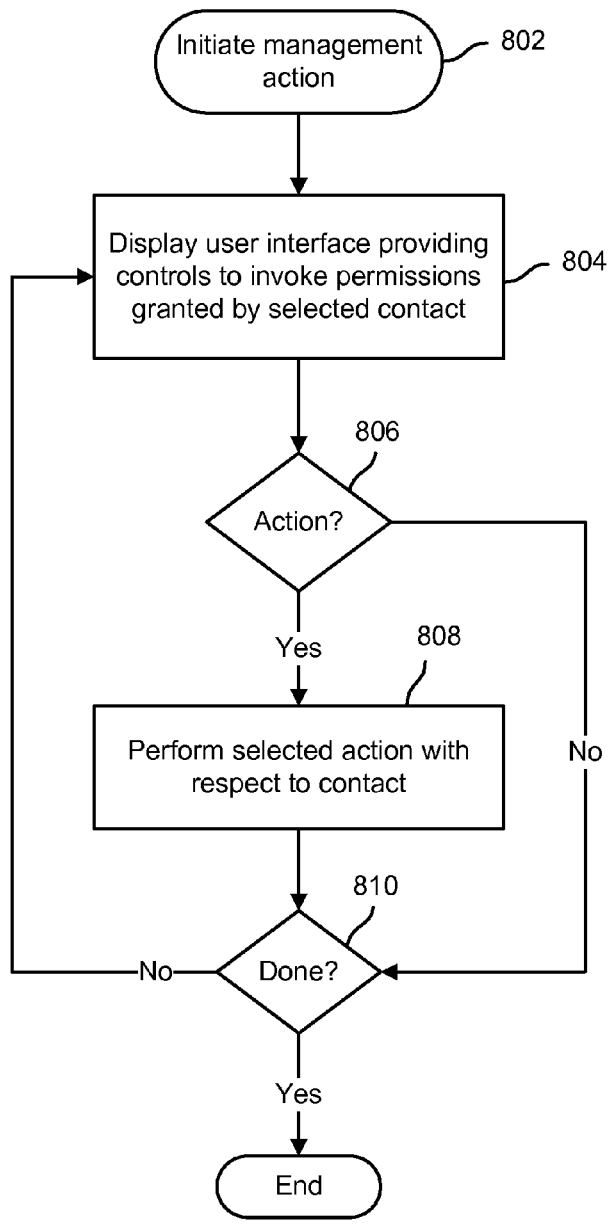
FIG. 8 is a flow chart illustrating an embodiment of a process to initiate a management action in an embodiment of a device-to-device management system.

FIG. 8 is a flow chart illustrating an embodiment of a process to initiate a management action in an embodiment of a device-to-device management system. In various embodiments, the process of FIG. 8 may be performed on a mobile device, such as devices 102, 104, 106, and 108 of FIGS. 1A-1C, e.g., by a peer-to-peer MDM app, such as app 302 of FIG. 3. In the example shown, an indication is received to initiate a management action (802). For example, a peer-to-peer MDM app, such as app 302 of FIG. 3, may be launched, and an option to access an interface to initiate management actions selected. A user interface to initiate management actions within the respective scope of permissions granted by one or more other users is displayed (804), e.g., the user interface of FIG. 4C. If an action within the scope of a permission that has been granted to the user to whom the user interface is displayed is initiated (806), the action is performed (808). The management action user interface may continue to be displayed (804) and responded to (806, 808) until the management action interface and/or the peer-to-peer management app are closed (810).

Figure 9A:
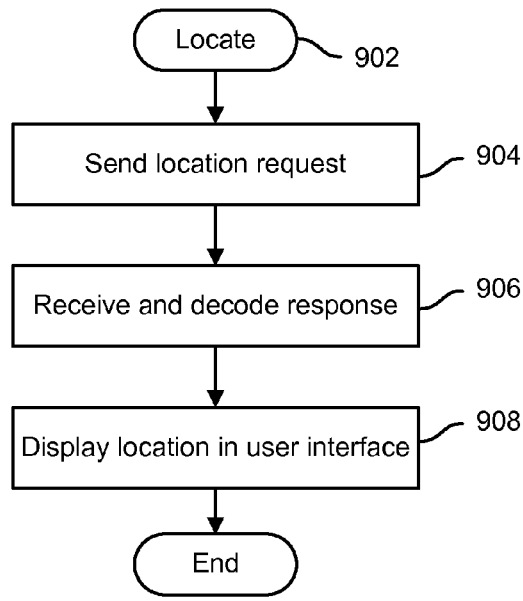
FIG. 9A is a flow chart illustrating an embodiment of a process to initiate a management action to locate a device in an embodiment of a device-to-device management system.

FIG. 9A is a flow chart illustrating an embodiment of a process to initiate a management action to locate a device in an embodiment of a device-to-device management system. In various embodiments, the process of FIG. 9A may be performed on a mobile device, such as devices 102, 104, 106, and 108 of FIGS. 1A-1C, e.g., by a peer-to-peer MDM app, such as app 302 of FIG. 3. In various embodiments, the process of FIG. 9A may be used to perform step 808 of FIG. 8, e.g., when an input to perform an action to "locate" a device associated with a selected contact is received. In the example shown, an indication to "locate" a device associated with a selected contact is received (902). A "report location" request is sent to the device associated with the contact (904). A response is received and decoded (906), e.g. to extract the location information. The device location is displayed in a user interface (908), e.g., in a map interface.

Figure 9B:
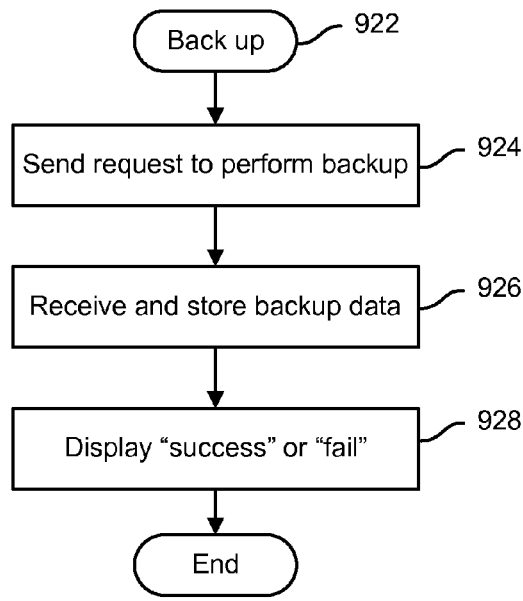
FIG. 9B is a flow chart illustrating an embodiment of a process to initiate a management action to back up a device in an embodiment of a device-to-device management system.

FIG. 9B is a flow chart illustrating an embodiment of a process to initiate a management action to back up a device in an embodiment of a device-to-device management system. In various embodiments, the process of FIG. 9B may be performed on a mobile device, such as devices 102, 104, 106, and 108 of FIGS. 1A-1C, e.g., by a peer-to-peer MDM app, such as app 302 of FIG. 3. In various embodiments, the process of FIG. 9B may be used to perform step 808 of FIG. 8, e.g., when an input to perform an action to "back up" data stored on a device associated with a selected contact is received. In the example shown, an indication to perform a "backup" operation with respect to a device associated with a selected contact is received (922). The indication may include an indication of a scope of data to be backed up, e.g., all user data, specified user data, contacts, etc. A "backup" request is sent to the device associated with the contact (924). Backup data sent by the target device in response to the request is received and stored (926). Upon completion or failure of the backup, a result message is displayed (928).

Figure 9C:
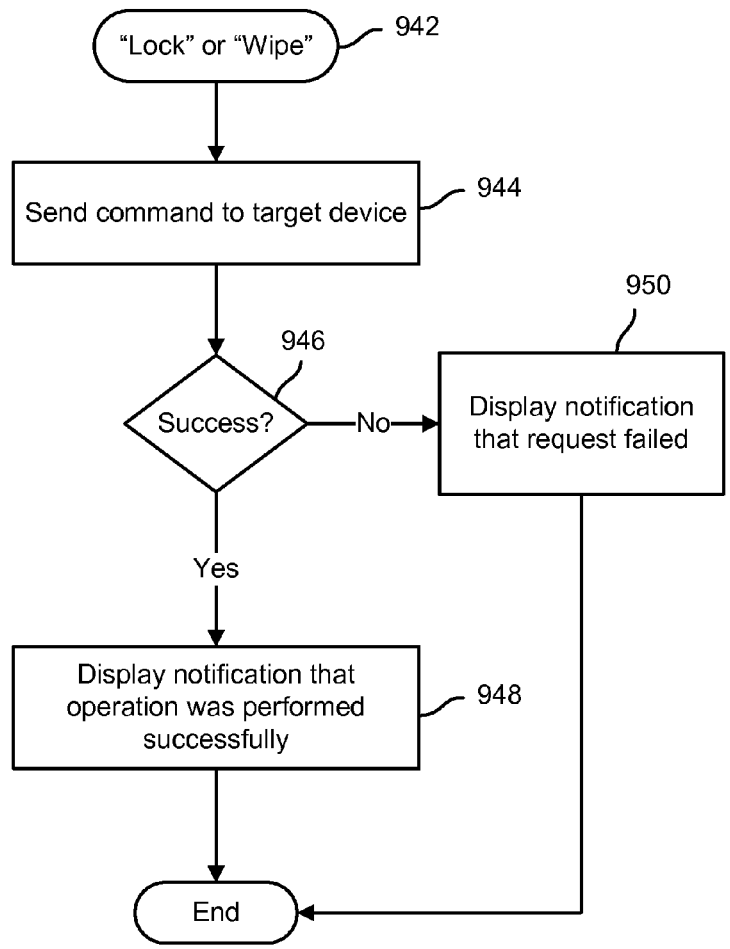
FIG. 9C is a flow chart illustrating an embodiment of a process to initiate a management action to lock or wipe a device in an embodiment of a device-to-device management system.

FIG. 9C is a flow chart illustrating an embodiment of a process to initiate a management action to lock or wipe a device in an embodiment of a device-to-device management system. In various embodiments, the process of FIG. 9C may be performed on a mobile device, such as devices 102, 104, 106, and 108 of FIGS. 1A-1C, e.g., by a peer-to-peer MDM app, such as app 302 of FIG. 3. In various embodiments, the process of FIG. 9C may be used to perform step 808 of FIG. 8, e.g., when an input to perform an action to "lock" or to "wipe" a device associated with a selected contact is received. In the example shown, an indication to "lock" or "wipe" a device associated with a selected contact is received (942). A "lock" or "wipe" command, as applicable, is sent to the target device (944). If a response is received indicating that the operation was performed as requested (946), a notification that the operation was performed successfully is displayed (948). Otherwise (946), a notification that the operation failed is displayed (950).

Figure 10:
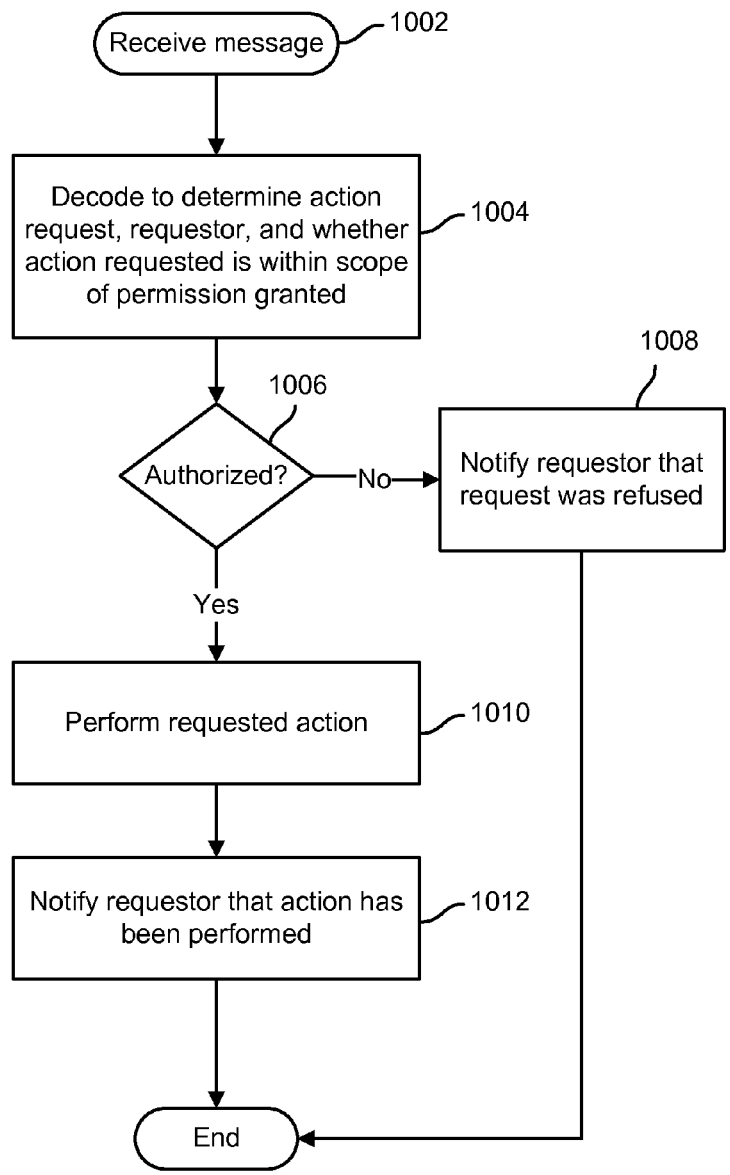
FIG. 10 is a flow chart illustrating an embodiment of a process to process a received request to perform a management action in an embodiment of a device-to-device management system.

FIG. 10 is a flow chart illustrating an embodiment of a process to process a received request to perform a management action in an embodiment of a device-to-device management system. In various embodiments, the process of FIG. 10 may be performed on a mobile device, such as devices 102, 104, 106, and 108 of FIGS. 1A-1C, e.g., by a peer-to-peer MDM app, such as app 302 of FIG. 3. In the example shown, a device management message is received (1002), e.g. on a port or other communication interface to which the device and/or peer-to-peer management app running thereon is configured to listen. The message is decoded to determine the action requested, which contact requested it, and whether the action requested is within the scope of a permission granted to that contact (1004). For example, if a request to "wipe" the device is received from a contact "A", the peer-to-peer management app may check permissions currently granted to contact "A" to confirm the contact "A" has been granted permission to wipe the device. If the request is determined not to be within the scope of a permission granted to the requesting user (1006), the requested operation is not performed and the requesting user is notified that the request was denied (1008). If the request is determined to be within the scope of a permission granted to the requesting user (1006), the requested operation is performed (1010) and the requesting user is notified that the request has been performed (1012).

Figure 11A:
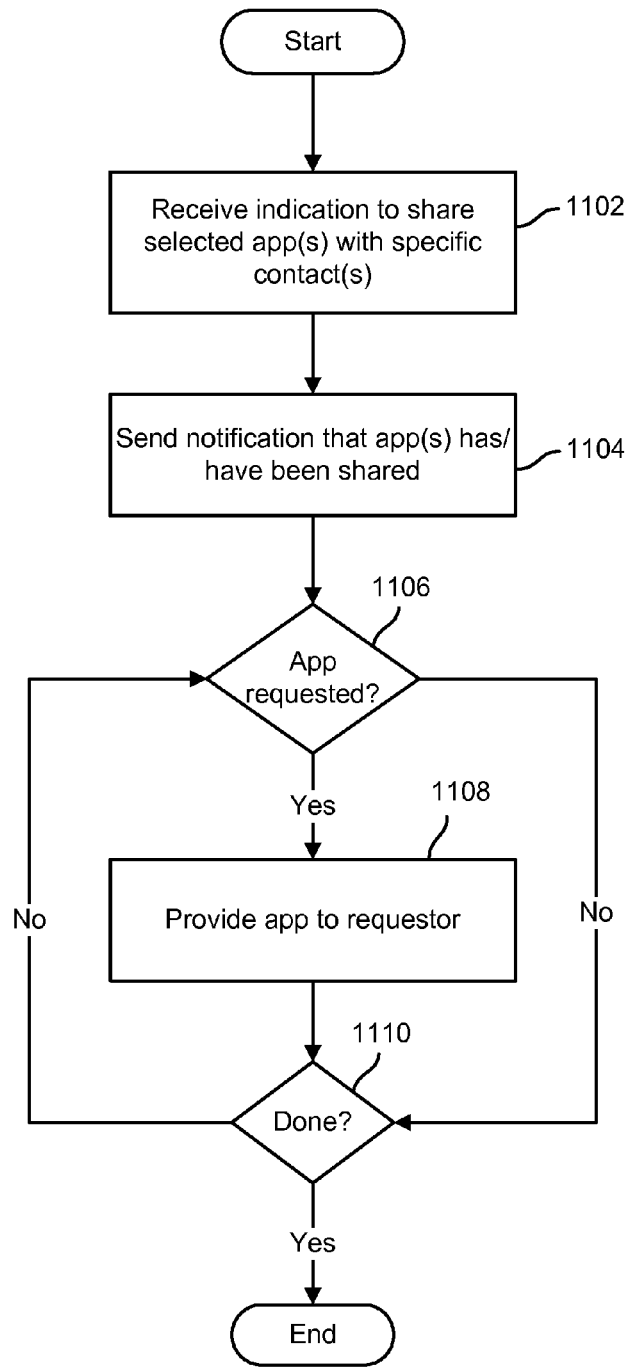
FIG. 11A is a flow chart illustrating an embodiment of a process to initiate a management action to share an app in an embodiment of a device-to-device management system.

FIG. 11A is a flow chart illustrating an embodiment of a process to initiate a management action to share an app in an embodiment of a device-to-device management system. In various embodiments, the process of FIG. 11A may be performed on a mobile device, such as devices 102, 104, 106, and 108 of FIGS. 1A-1C, e.g., by a peer-to-peer MDM app, such as app 302 of FIG. 3. In the example shown, an indication to share one or more selected apps (or other device resources and/or capabilities) with one or more specified contacts is received (1102). A notification that the app(s) has/have been shared is sent to the selected contact(s) (1104). If the shared app (or other shared resource/capability) is requested (1106), the app (or access to, e.g., remote use of, the shared resource/capability) is provided to the requestor (1108). For example, the app binary may be sent directly from the device to a device associated with the contact that requested the app. Alternatively, a copy may be authorized to be provided by download from a third node. The process of FIG. 11A continues until done (1110), e.g., there are no further currently active shared apps or other resources.

Figure 11B:
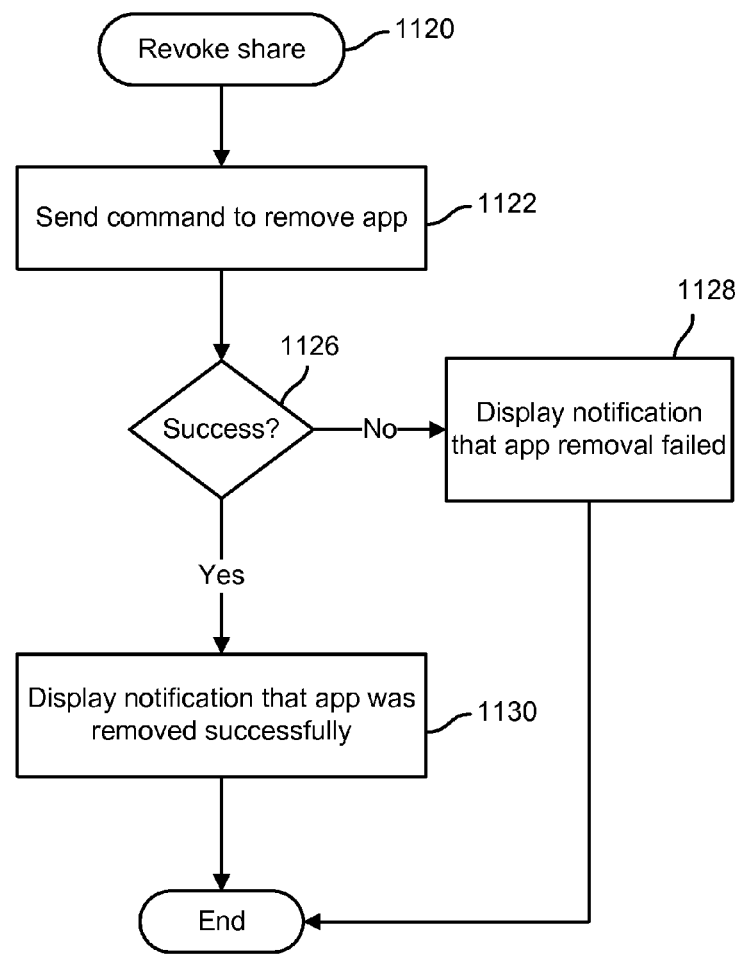
FIG. 11B is a flow chart illustrating an embodiment of a process to initiate a management action to revoke sharing of an app (or other resource/capability) in an embodiment of a device-to-device management system.

FIG. 11B is a flow chart illustrating an embodiment of a process to initiate a management action to revoke sharing of an app (or other resource/capability) in an embodiment of a device-to-device management system. In various embodiments, the process of FIG. 11B may be performed on a mobile device, such as devices 102, 104, 106, and 108 of FIGS. 1A-1C, e.g., by a peer-to-peer MDM app, such as app 302 of FIG. 3. In the example shown, an indication to revoke sharing of an app (or other device resource and/or capability) shared previously with one or more specified contacts is received (1120). A command to revoke sharing and remove the app (if downloaded) is sent (1122). In various embodiments, the users/devices with which the app has been shared may be responsive to the command (1122) to delete or otherwise remove the app from the device at which the command to remove the app is received, e.g., via an iteration of the process of FIG. 10. If the app (or other resource, if downloaded) cannot be removed (or disabled in place) (1126), a notification is displayed that the removal operation failed (1128). If the app (or other resource, if downloaded) is removed (or disabled in place) successfully (1126), a notification that the removal operation was completed successfully is displayed (1130).

In various embodiments, techniques described herein may be used to manage devices in situations in which computing resources, infrastructure, and knowledge may prevent traditional approaches to enterprise mobility management (EMM) from being used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing devices, comprising:
   receiving, at a first mobile device from a second mobile device that is a peer of the first mobile device a message indicating that a device management permission with respect to the second mobile device has been granted to a user associated with the first mobile device, wherein the first mobile device is configured to receive an input from the user associated with the first mobile device, wherein the input indicates whether the user associated with the first mobile device accepted or declined the device management permission with respect to the second mobile device;
   in response to the device management permission with respect to the second mobile device being accepted, configuring the first mobile device to be used to perform with respect to the second mobile device a device management action associated with the device management permission; and
   in response to the device management permission with respect to the second mobile device being declined, updating data associated with the first mobile device to reflect that the first mobile device declined the device management permission with respect to the second mobile device.

2. The method of claim 1, wherein the message is sent using a lightweight messaging protocol.

3. The method of claim 1, wherein the second mobile device is associated with a contact stored on the first mobile device and wherein configuring the first mobile device to be used to perform with respect to the second mobile device a device management action associated with the device management permission includes associating the device management permission with the contact.

4. The method of claim 1, wherein configuring the first mobile device to be used to perform with respect to the second mobile device a device management action associated with the device management permission is performed at least in part in response to a user input indicating the user associated with the first mobile device has accepted the grant of the device management permission.

5. The method of claim 1, wherein the device management permission comprises a permission to lock the second mobile device.

6. The method of claim 1, wherein the device management permission comprises a permission to wipe the second mobile device.

7. The method of claim 1, wherein the device management permission comprises a permission to obtain a location of the second mobile device.

8. The method of claim 1, wherein the device management permission comprises a permission to perform one or more of the following with respect to the second mobile device: backup user data; backup app data; backup contacts; access user data; access app data; and access contacts.

9. The method of claim 1, wherein the device management permission comprises a permission to use a resource of the second mobile device.

10. The method of claim 1, wherein the device management permission comprises sharing of an app on the second mobile device.

11. The method of claim 1, wherein configuring the first mobile device to be used to perform with respect to the second mobile device a device management action associated with the device management permission includes providing a user interface to initiate the device management action with respect to the second mobile device.

12. The method of claim 11, further comprising receiving via the user interface an input to initiate the device management action with respect to the second mobile device; and sending to the second mobile device a management action request message; wherein the second mobile device is configured to perform the device management action at least in part in response to receiving the management action request message.

13. A system to manage devices, comprising:
   a communication interface; and
   a processor coupled to the communication interface and configured to:
      receive via the communication interface, at a first mobile device, a message from a second mobile device that is a peer of the first mobile device indicating that a device management permission with respect to the second mobile device has been granted to a user associated with the first mobile device, wherein the first mobile device is configured to receive an input from the user associated with the first mobile device, wherein the input indicates whether the user associated with the first mobile device accepted or declined the device management permission with respect to the second mobile device;

in response to the device management permission with respect to the second mobile device being accepted, configure the first mobile device to be used to perform with respect to the second mobile device a device management action associated with the device management permission; and in response to the device management permission with respect to the second mobile device being declined, update data associated with the first mobile device to reflect that the first mobile device declined the device management permission with respect to the second mobile device.

14. The system of claim 13, wherein the message is received and processed by a peer-to-peer mobile device management app installed on the first mobile device and wherein the peer-to-peer mobile device management app is configured to receive the message, extract the device management permission from the message, and store data associating the device management permission with the second mobile device.

15. The system of claim 13, wherein the message is sent using a lightweight messaging protocol.

16. The system of claim 13, wherein the second mobile device is associated with a contact stored on the first mobile device and wherein configuring the first mobile device to be used to perform with respect to the second mobile device a device management action associated with the device management permission includes associating the device management permission with the contact.

17. A computer program product to manage devices, the computer program product being embodied in a non-transitory computer readable medium and comprising computer instructions for:

receiving at a first mobile device from a second mobile device that is a peer of the first mobile device a message indicating that a device management permission with respect to the second mobile device has been granted to a user associated with the first mobile device, wherein the first mobile device is configured to receive an input from the user associated with the first mobile device, wherein the input indicates whether the user associated with the first mobile device accepted or declined the device management permission with respect to the second mobile device;

in response to the device management permission with respect to the second mobile device being accepted, configuring the first mobile device to be used to perform with respect to the second mobile device a device management action associated with the device management permission; and in response to the device management permission with respect to the second mobile device being declined, updating data associated with the first mobile device to reflect that the first mobile device declined the device management permission with respect to the second mobile device.

18. The method of claim 1, wherein the message is received and processed by a peer-to-peer mobile device management app installed on the first mobile device.

19. The method of claim 18, wherein the peer-to-peer mobile device management app installed on the first mobile device comprises a first instance of the peer-to-peer mobile device management app; and wherein the message is generated and sent by a second instance of the peer-to-peer mobile device management app installed on the second mobile device.

20. The method of claim 18, wherein the peer-to-peer mobile device management app is configured to receive the message, extract the device management permission from the message, and store data associating the device management permission with the second mobile device.

* * * * *